(12) United States Patent
Burgeff et al.

(10) Patent No.: US 9,022,656 B2
(45) Date of Patent: May 5, 2015

(54) VIBRATION-DAMPING PLAIN BEARING COMPOSITE AND PLAIN BEARING BUSHING AND PLAIN BEARING ASSEMBLY

(75) Inventors: Dominique Burgeff, Eupen (BE); Juergen Hartmann, Willich (DE); Joerg Heldmann, Aachen (DE)

(73) Assignee: Saint-Gobain Performance Plastics Pampus GmbH, Willich (DE)

( * ) Notice: Subject to any disclaimer, the term of this patent is extended or adjusted under 35 U.S.C. 154(b) by 230 days.

(21) Appl. No.: 13/121,698

(22) PCT Filed: Sep. 30, 2009

(86) PCT No.: PCT/IB2009/007004
§ 371 (c)(1),
(2), (4) Date: Jun. 13, 2011

(87) PCT Pub. No.: WO2010/038137
PCT Pub. Date: Apr. 8, 2010

(65) Prior Publication Data
US 2011/0262064 A1    Oct. 27, 2011

(30) Foreign Application Priority Data

Sep. 30, 2008   (DE) .......................... 10 2008 049 747

(51) Int. Cl.
*F16C 33/02* (2006.01)
*F16C 27/06* (2006.01)
*F16C 33/20* (2006.01)

(52) U.S. Cl.
CPC .............. *F16C 27/063* (2013.01); *F16C 33/201* (2013.01)

(58) Field of Classification Search
CPC ........ F16C 27/06; F16C 27/063; B21D 53/10
USPC .................. 384/215, 220, 221, 275, 276, 296
See application file for complete search history.

(56) References Cited

U.S. PATENT DOCUMENTS 2,689,380 A    9/1954  Tait
2,691,814 A   10/1954  Tait
(Continued)

FOREIGN PATENT DOCUMENTS

DE    2944052 A1    5/1980
DE    3241002 A     5/1984
(Continued)

OTHER PUBLICATIONS

International Search Report from PCT/IB2009/007004 dated Feb. 18, 2010, 1 pg.
(Continued)

*Primary Examiner* — Thomas R. Hannon
*Assistant Examiner* — Adam D Rogers
(74) *Attorney, Agent, or Firm* — Chi Suk Kim; Abel Law Group, LLP

(57) ABSTRACT

A vibration-damping plain bearing composite comprising a sliding layer, a dimensionally stable support layer and an elastic layer. In one embodiment, the dimensionally stable support layer is arranged between the sliding layer and the elastic layer; in another embodiment, the elastic layer is arranged between the sliding layer and the dimensionally stable support layer. The bearing composites are characterized that a ratio of the thickness of the elastic layer $t_{EL}$ to a thickness of the sliding layer $t_{SL}$ is at least 3.

13 Claims, 5 Drawing Sheets

(56) References Cited

U.S. PATENT DOCUMENTS

| | | | |
|---|---|---|---|
| 2,740,649 A | 4/1956 | Latzen | |
| 2,788,324 A | 4/1957 | Mitchell | |
| 2,798,005 A | 7/1957 | Love | |
| 2,813,041 A | 11/1957 | Mitchell et al. | |
| 2,835,521 A | 5/1958 | White | |
| 2,855,232 A | 10/1958 | Kozak | |
| 2,995,462 A | 8/1961 | Mitchell et al. | |
| 3,017,209 A | 1/1962 | Thomas | |
| 3,030,132 A | 4/1962 | Compton | |
| 3,058,791 A | 10/1962 | Stallman | |
| 3,194,702 A | 7/1965 | Geller et al. | |
| 3,234,128 A | 2/1966 | McLeish et al. | |
| 3,239,257 A | 3/1966 | White | |
| 3,282,602 A | 11/1966 | Willingshofer et al. | |
| 3,331,642 A | 7/1967 | Krauss | |
| 3,495,858 A | 2/1970 | Kindel | |
| 3,507,527 A | 4/1970 | White | |
| 3,544,415 A | 12/1970 | Price et al. | |
| 3,582,166 A | 6/1971 | Reising | |
| 3,711,166 A | 1/1973 | Wayson | |
| 3,781,073 A | 12/1973 | Jorn et al. | |
| 3,881,791 A | 5/1975 | Hentschel | |
| 3,924,907 A | 12/1975 | Czernik et al. | |
| 3,929,396 A | 12/1975 | Orkin et al. | |
| 3,944,376 A | 3/1976 | Hata | |
| 3,958,840 A * | 5/1976 | Hickox et al. | 384/129 |
| 3,993,371 A | 11/1976 | Orndorff, Jr. | |
| 4,080,233 A | 3/1978 | McCloskey et al. | |
| 4,142,833 A * | 3/1979 | Rybicki et al. | 416/134 A |
| 4,196,249 A | 4/1980 | Patrichi | |
| 4,231,673 A | 11/1980 | Satoh et al. | |
| 4,238,137 A | 12/1980 | Furchak et al. | |
| 4,423,667 A | 1/1984 | Hayashi | |
| 4,547,434 A | 10/1985 | Sumiyoshi et al. | |
| 4,767,108 A | 8/1988 | Tanaka et al. | |
| 5,033,722 A | 7/1991 | Lammers | |
| 5,143,456 A * | 9/1992 | Jordens et al. | 384/275 |
| 5,143,457 A * | 9/1992 | Langhof et al. | 384/276 |
| 5,433,870 A | 7/1995 | Nakamaru et al. | |
| 5,492,428 A | 2/1996 | Hellon et al. | |
| 5,573,846 A | 11/1996 | Harig et al. | |
| 5,593,233 A * | 1/1997 | Kammel et al. | 384/222 |
| 5,752,780 A | 5/1998 | Dorr | |
| 5,819,881 A * | 10/1998 | Stringer | 188/67 |
| 5,915,842 A | 6/1999 | Redinger | |
| 5,971,617 A | 10/1999 | Woelki et al. | |
| 6,170,990 B1 * | 1/2001 | Hawkins | 384/297 |
| 6,258,413 B1 | 7/2001 | Woelki et al. | |
| 6,464,396 B1 | 10/2002 | Schubert et al. | |
| 6,505,989 B1 | 1/2003 | Pazdirek et al. | |
| 6,669,370 B1 * | 12/2003 | Storch et al. | 384/129 |
| 6,702,467 B2 * | 3/2004 | Testroet | 384/222 |
| 6,773,197 B2 | 8/2004 | Urbach | |
| 6,824,323 B2 | 11/2004 | Garnier et al. | |
| 6,918,635 B2 | 7/2005 | Finner et al. | |
| 7,771,120 B2 * | 8/2010 | Kagohara et al. | 384/294 |
| 7,820,298 B2 | 10/2010 | Welsch | |
| 7,887,922 B2 * | 2/2011 | Mayston et al. | 428/457 |
| 7,942,581 B2 * | 5/2011 | Leonardelli | 384/276 |
| 2003/0012467 A1 | 1/2003 | Merot et al. | |
| 2003/0121122 A1 | 7/2003 | Carlstedt et al. | |
| 2003/0134141 A1 * | 7/2003 | Okado et al. | 428/626 |
| 2005/0105961 A1 | 5/2005 | Kondoh | |
| 2005/0260431 A1 | 11/2005 | Wolki et al. | |
| 2006/0251887 A1 | 11/2006 | Welsch | |
| 2009/0042040 A1 | 2/2009 | Paul et al. | |
| 2010/0040407 A1 | 2/2010 | Rechtien et al. | |
| 2010/0092119 A1 | 4/2010 | Angenheister | |
| 2011/0262064 A1 | 10/2011 | Burgeff et al. | |

FOREIGN PATENT DOCUMENTS

| | | |
|---|---|---|
| DE | 3342593 A1 | 6/1985 |
| DE | 3516649 A1 | 11/1986 |
| DE | 3534242 A1 | 3/1987 |
| DE | 3601568 A1 | 7/1987 |
| DE | 101 16 053 A1 | 10/2002 |
| DE | 101 61 866 A1 | 7/2003 |
| DE | 10 2004 015 977 A1 | 10/2005 |
| DE | 698 31 675 T2 | 6/2006 |
| DE | 20 2005 006 868 U1 | 10/2006 |
| DE | 10 2006 021 132 B3 | 11/2007 |
| DE | 10 2007 016 713 A1 | 10/2008 |
| EP | 0217462 A1 | 4/1987 |
| EP | 0498150 B1 | 9/1994 |
| EP | 1010902 A2 | 6/2000 |
| GB | 875003 A | 8/1961 |
| GB | 2139236 A | 11/1984 |
| GB | 2270720 A | 3/1994 |
| JP | 50-7684 | 3/1975 |
| JP | 54-91665 | 7/1979 |
| JP | 55161918 U | 11/1980 |
| JP | 58124820 A | 7/1983 |
| JP | 58187618 A | 11/1983 |
| JP | 60053213 A | 3/1985 |
| JP | S6113025 A | 1/1986 |
| JP | S6353313 A | 3/1988 |
| JP | S63190931 A | 8/1988 |
| JP | 05071540 A | 3/1993 |
| JP | 06270294 A | 9/1994 |
| JP | H07279947 A | 10/1995 |
| JP | 11001672 A | 1/1999 |
| JP | 2002213453 A | 7/2002 |
| JP | 2005502438 A | 1/2005 |
| KR | 10-1995-0023868 A | 8/1995 |
| KR | 10-2001-0032595 A | 4/2001 |
| WO | 90/12965 A1 | 11/1990 |
| WO | 99/05425 A | 2/1999 |
| WO | 99/28639 A1 | 6/1999 |
| WO | 01/55607 A1 | 8/2001 |
| WO | 2004/036066 A2 | 4/2004 |
| WO | 2006018684 A1 | 2/2006 |
| WO | 2007/128643 A1 | 11/2007 |
| WO | 2010/038137 A1 | 4/2010 |

OTHER PUBLICATIONS

International Search Report from PCT/EP2008/053677 dated Jul. 18, 2008, 2 pgs.

International Search Report from PCT/EP1998/04959 dated Jan. 12, 1999, 2 pgs.

International Search Report from PCT/EP2007/053526 dated Nov. 30, 2007, 2 pgs.

* cited by examiner

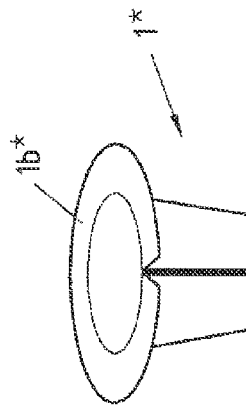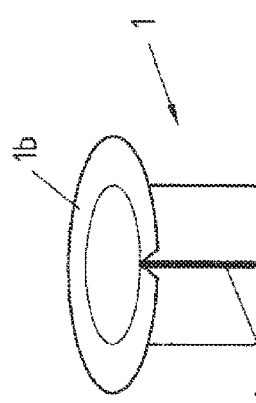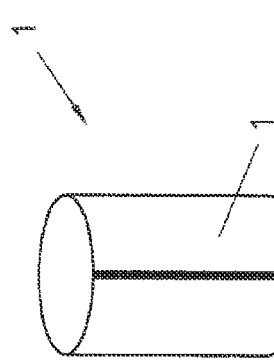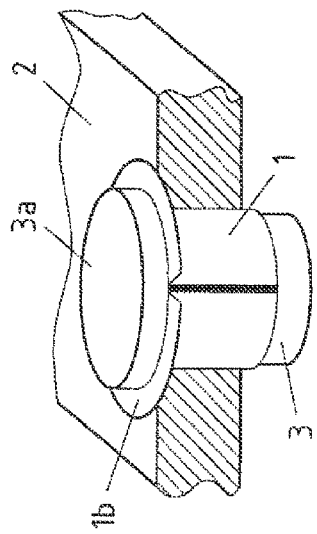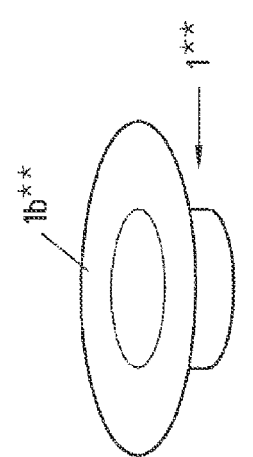

VIBRATION-DAMPING PLAIN BEARING COMPOSITE AND PLAIN BEARING BUSHING AND PLAIN BEARING ASSEMBLY

The disclosure relates to a vibration-damping plain bearing composite. The disclosure further relates to a plain bearing bushing produced from this material, a plain bearing assembly and a process for producing a plain bearing composite.

Plain bearings made of composites, including ones provided with an elastomer layer (e.g. U.S. Pat. No. 3,881,791), have been known for a long time and are used in the automobile industry and also in other branches of industry in a variety of ways as plain bearings of differing geometries, for example as cylindrical plain bearing bushings.

Such a cylindrical plain bearing bushing having a surrounding elastomer layer is described in U.S. 2003/0012467 A1. It comprises a shell-like cylindrical plain bearing composed of a polymer, e.g. polyimide, which is surrounded by an elastomer shell. To produce this bearing assembly, the cylindrical plain bearing can, according to U.S. 2003/0012467 A1, be pressed into an elastomer ring. A further possibility is to injection-mold the shell-like elastomer layer around the polymeric plain bearing. However, this can be achieved satisfactorily only in the case of very simple geometries, for example purely cylindrical shells, or is associated with a considerable outlay.

DE 20 2005 006 868 U1 discloses a further plain bearing composite system in which a metallic support is coated with an elastomer layer on which a friction-reducing, for example PTFE-containing, outer layer is arranged as sliding layer. Specifically, DE 20 2005 006 868 U1 states that the friction-reducing outer layer and also the elastomer layer and the bonding layer joining the elastomer layer to the metallic support material are in each case applied as solvent-containing wet coating composition to the respective underlying layer. As a result, for example in the case of the elastomer layer, only comparatively low layer thicknesses of typically from 5 to 120 μm are possible. However, application of the individual layers to the support material as wet coating composition allows the production of more complex shapes, for example a bearing bushing provided with an axial collar, without the layer system being destroyed during shaping since the composite is only finished after the shaping step. However, satisfactory vibration damping is not possible with such a bearing bushing since the elastomer layer which is mainly responsible for vibration damping does not have a sufficient thickness.

In the light of this prior art, it is an object of the disclosure to provide a vibration-damping plain bearing composite which has particularly favorable sound- and vibration-damping properties and also allows the production of relatively complex three-dimensional bearing geometries without there being a risk of destroying the composite material.

In an embodiment, a vibration-damping plain bearing composite can include a sliding layer comprising a sliding material, a dimensionally stable support layer and an elastic layer, where the plain bearing composite can be obtained by:

providing the sliding layer, the dimensionally stable support layer and the elastomer layer each in the form of sheet-like material, in particular strip-shaped continuous material, joining the sliding layer over its area to the dimensionally stable support layer and joining the elastic layer over its area to the dimensionally stable support layer on the side of the dimensionally stable support layer which faces away from the sliding layer or providing the sliding layer, the dimensionally stable support layer and the elastomer layer each in the form of sheet-like material, in particular strip-shaped continuous material, joining the sliding layer over its area to the elastomer layer and joining the elastomer layer over its area to the dimensionally stable support layer on the side of the elastomer layer which faces away from the sliding layer.

The plain bearing composite thus can comprise a layer system having at least three layers. The dimensionally stable support layer can be arranged between the sliding layer and the elastic layer. It is likewise possible for the elastic layer to be arranged between the sliding layer and the dimensionally stable support layer.

Further layers can be provided on the side of the plain bearing composite which faces away from the sliding layer. If, for example, the elastic layer is arranged between sliding layer and dimensionally stable support layer, an additional elastic layer can be provided on the uncoated side of the dimensionally stable support layer; the additional elastic layer can be provided as sheet-like material and can be joined over its area to the dimensionally stable support layer.

In an embodiment, the plain bearing composite can have a particularly strong bond between the individual layers, so that the composite can be converted by various shaping techniques, for example from a flat material, into a three-dimensional geometry system. The layer system itself can have a simple structure and has particularly good vibration- and noise-damping properties. This can be achieved by, firstly, the layers being joined to one another over their entire area and, secondly, the provision of the individual layers as sheet-like starting materials allowing wide variation of the individual layer thicknesses. When the plain bearing composite, for example in the form of a plain bearing bushing having an axial collar, is used, it can be possible to achieve optimal vibration damping regardless of the type and magnitude of the relative motion between the components of the bearing. Furthermore, the elastic layer which is firmly integrated in the composite can give effective structure-borne sound decoupling, so that the transmission of sound via the bearing can be minimized. If such a plain bearing bushing is used in a seat structure, this means effective vibration damping and decoupling of the vehicle floor assembly from the seat support structure, which can noticeably increase driver and passenger comfort.

An aspect of the plain bearing composite is that it can be obtained in one or more process steps from the individual layers which are initially present as sheet-like materials. Sheet-like materials can, for example, be in the form of continuous strips which in the production process are continually rolled off and joined to one another in one or more steps to produce the composite material. This can make it possible, as mentioned above, to produce plain bearing composites having a particularly pronounced proportion of elastic layer, as a result of which the bearing produced from the plain bearing composite can be matched more readily to given bearing housing geometries and can be able to even out tolerances and also misalignments between the bearing components without being destroyed. In particular, when local stress peaks occur, for example in the case of jamming due to misalignments, load stresses can be leveled out by elastic deformation.

Due to the above-described advantageous properties, the plain bearing composite can be used in a wide variety of ways. For example, it can, after appropriate shaping, be used as hinge bearing in which case the high elastic deformability can be utilized to generate defined torques.

The joining, firstly, of the sliding layer over its area to the dimensionally stable support layer and, secondly, of the elastic layer over its area to the dimensionally stable support layer on the side facing away from the sliding layer can produce a layer system which, for example, can be formed to produce a cylindrical bearing bushing having an interior sliding layer. The elastic layer can be arranged on the outside and is thus in contact with a bearing housing. Here, the significantly higher coefficient of friction of elastomers of which the elastic layer can, for example, be formed against the material of the bearing housing, for example steel, compared to a materials pairing of steel against steel ensures that turning of the composite plain bearing in the housing is effectively prevented. This can be particularly useful in the case of loose seat fitting of the plain bearings in bearing housings such as belt tensioners.

In an embodiment, the vibration-damping plain bearing composite can be obtained by providing the individual layers each in the form of sheet-like material, by joining the sliding layer over its area to the dimensionally stable support layer and by joining the elastic layer over its area to the dimensionally stable support layer on the side of the dimensionally stable support layer facing away from the sliding layer.

Firstly, the sliding layer can be joined to the dimensionally stable support layer. Preferably, this can be effected by means of an adhesive in a temperature range from 250 to 400° C. The adhesive can comprise at least a fluoro polymer, in particular perfluoroalkoxy polymer (PFA), perfluoro(methyl vinyl ether) (MFA), ethylene-tetrafluoroethylene (ETFE), polychlorotrifluoroethylene (PCTFE), polyvinylidene fluoride (PVDF), fluorinated ethylene-propylene (FEP), terpolymer of tetrafluoroethylene, hexafluoropropylene, vinylidene fluoride (THV), cured adhesives, in particular epoxy adhesives, polyimide adhesives and/or low-temperature hot melt adhesives, in particular ethylene-vinyl acetate and polyether-polyamide copolymers, or suitable thermoplastics and/or mixtures thereof.

The joining of elastic layer and dimensionally stable support layer can be effected by means of a bonding agent. If the elastic layer comprises an elastomer, for example nitrile rubber, neoprene rubber, silicone rubber, an olefinic elastomer, a styrene elastomer, a thermoplastic elastomer, a crosslinked elastomer, a polyether-polyester elastomer, an ethylene-propylene elastomer, ethylene-acrylate rubbers and/or a fluoro elastomer, the firm bond between the support material and elastic layer can be produced by means of a vulcanization process at a temperature of about 150-250° C. Here, crosslinking can occur within the elastomer and with the surface of the support material which has been activated by the bonding agent. The bonding layer which is thus present between support material and elastic layer can comprise at least one reactive polymer, in particular a polymer based on silane, and/or pigments in a solvent, in particular in methyl isobutyl ketone, in xylene, in ethanol and water or in ethanol and methyl ethyl ketone.

Owing to the two joining steps which can be carried out at different temperatures, the production of the vibration-damping plain bearing composite, in which the sliding layer and the elastic layer are each joined to a surface of the dimensionally stable support layer, can be carried out in a two-stage process. Here, the bond between sliding layer and dimensionally stable support layer can be produced first since this should be carried out at the higher temperature. After cooling of the intermediate comprising sliding layer and dimensionally stable support layer to a temperature range suitable for partial vulcanization of the elastic layer (about 150°-250° C.), the second bond, namely the bond between the elastic layer and the dimensionally stable support layer on the side of the dimensionally stable support layer facing away from the sliding layer can be produced.

As an alternative, the vibration-damping plain bearing composite can comprise a composite system formed by sliding layer, dimensionally stable support layer and elastic layer, in which the elastic layer is arranged between the sliding layer and the dimensionally stable support layer. This makes it possible to carry out both joining operations in one step since both bonds can be produced in a vulcanization process.

The sliding material present in the sliding layer can have a wide variety of chemical compositions. It preferably comprises a plastic, in particular a plastic selected from the group consisting of fluoro polymers, in particular polytetrafluoroethylene (PTFE), fluorinated ethylene-propylene (FEP), polyvinylidene fluoride (PVDF), polychlorotrifluoroethylene (PCTFE) and perfluoroalkoxy polymer (PFA), and polyacetal, polyether ether ketone (PEEK), polyethylene (PE), polysulfone, in particular polyether sulfone, polyamide (PA), polyimide (PI), polyphenylene sulfide (PPS), polyurethane (PUR), polyester, polyphenylene oxide and mixtures thereof.

The dimensionally stable support layer can comprise metal, in particular steel, stainless steel, copper, titanium, bronze, brass, aluminum or an alloy thereof.

As regards the individual layer thicknesses of the layers forming the plain bearing composite, particularly advantageous damping and structure-borne sound decoupling properties are achieved when the thickness of the elastic layer is a multiple of the thickness of the sliding layer. Thus, the thickness of the elastic layer can be from 0.15 to 5 mm, such as from 0.3 to 0.6 mm. The sliding layer can have a thickness of from 0.05 to 1.0 mm, such as from 0.1 to 0.3 mm. The dimensionally stable support layer in turn can have a thickness of from 0.1 to 1.5 mm, such as from 0.2 to 0.5 mm.

In a further embodiment, the sliding layer and the dimensionally stable support layer can be integrated in such a way that the support layer is surrounded by the sliding material of the sliding layer. Here, the joining of the sliding layer over its area to the dimensionally stable support layer can comprise producing an integral layer composite. In this case, the support layer can be configured as a metal insert, in particular as a woven metal mesh, expanded metal or metal nonwoven, in the sliding material of the sliding layer.

The plain bearing bushing preferably can have at least one axial collar arranged at the end face. Owing to the high-strength bond between the individual layers of the plain bearing composite, namely the sliding layer, the dimensionally stable support layer, and the elastic layer, forming of such an axial collar can be achieved readily without tearing-off or detachment of one or more layers occurring.

The plain bearing bushing can have an essentially cylindrical shape, but it is likewise possible for the plain bearing bushing to have a conical shape, with or without an axial collar.

As a result of the strong bond between the layers, the plain bearing bushing can be produced in various ways from the vibration-damping plain bearing composite. Thus, it is possible to produce the plain bearing bushing by rolling or bending from the plain bearing composite which is initially present as flat material.

As an alternative, it is possible to produce the plain bearing bushing by combined stamping and deep drawing.

The vibration-damping plain bearing composite can be used in a variety of ways in the form of a plain bearing bushing with or without an axial collar or else in another form. The use in hinges for compensating misalignments, as tolerance leveling element, and for producing defined torques between the bearing components is conceivable. In seats, the plain bearing composite can likewise be used for evening out of tolerances and for the compensation of misalignments and in particular for structure-borne sound decoupling for increasing the comfort of driver and passengers. These properties can also be exploited in the use of the plain bearing composite in a vehicle steering system, in chassis components of a vehicle and for high-frequency oscillating movements (belt tensioners, two-mass flywheel, decoupled belt pulley, shock absorbers and components for the vehicle suspension).

In a further embodiment, a vibration-damping plain bearing assembly can comprise a bearing housing, a plain bearing bushing and a bearing shaft. An advantageous embodiment provides for the elastic layer of the plain bearing composite of the plain bearing bushing to be prestressed perpendicular to the extension of its layers. As a result of this prestressing of the elastic layer, gradual removal of material from the sliding layer over the life of the plain bearing can be compensated by a corresponding expansion of the prestressed elastic layer, so that play-free melting of the bearing components is ensured over the entire life of the plain bearing.

In yet another embodiment, a process for producing a vibration-damping plain bearing composite comprising a sliding layer comprising a plain bearing material, a dimensionally stable support layer and an elastic layer can comprise:

provision of the sliding layer, the dimensionally stable support layer and the elastomer layer each in the form of sheet-like material, in particular strip-shaped continuous material, joining of the sliding layer over its area to the dimensionally stable support layer and joining of the elastic layer over its area to the dimensionally stable support layer on the side of the dimensionally stable support layer which faces away from the sliding layer or provision of the sliding layer, the dimensionally stable support layer and the elastomer layer each in the form of sheet-like material, in particular strip-shaped continuous material, joining of the sliding layer over its area to the elastomer layer and joining of the elastomer layer over its area to the dimensionally stable support layer on the side of the elastomer layer which faces away from the sliding layer.

The present disclosure may be better understood, and its numerous features and advantages made apparent to those skilled in the art by referencing the accompanying drawings.

FIG. 1 shows a cylindrical plain bearing bushing having a slit produced from the plain bearing composite by rolling, in perspective view.

FIGS. 2a,b show cylindrical and conical plain bearing bushings having an axial collar produced from the plain bearing composite by rolling, in perspective view.

FIG. 3 shows a first plain bearing assembly in perspective view.

FIG. 4 shows a second plain bearing assembly in perspective view.

FIG. 5 shows a plain bearing bushing having an axial collar produced by deep drawing.

The use of the same reference symbols in different drawings indicates similar or identical items.

Figure 6:
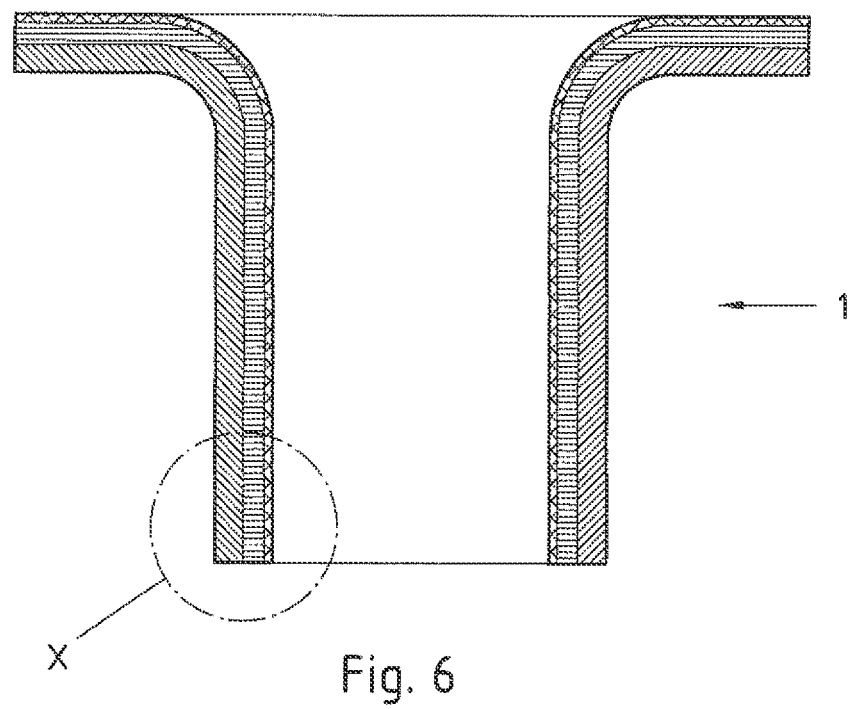
FIG. 6 shows the plain bearing bushing of FIG. 2a in axial section.
Figure 7:
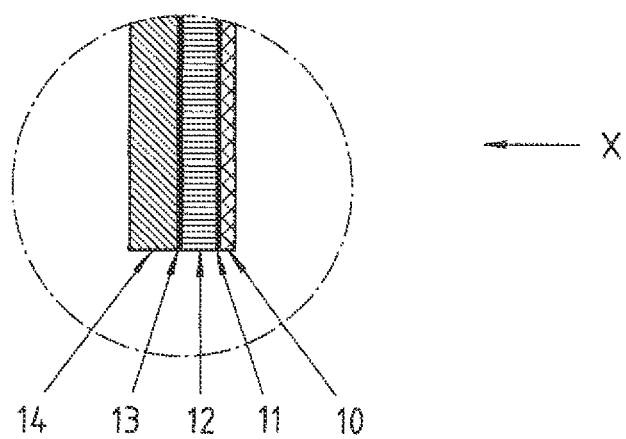
FIG. 7 shows the detail X from FIG. 6.

The plain bearing bushing 1 shown in FIG. 1 has been produced by rolling of an appropriately dimensioned piece of plain bearing composite which is initially present as flat material. As an alternative, bending of a piece of material is also possible. The opposite ends of the rolled piece of material bound a slit 1a. In the present case, the slit 1a runs in a straight line in the axial direction. Slits running in any nonlinear fashion and/or obliquely to the axis of symmetry of the bushing 1 are also possible. In the plain bearing bushing 1 of FIG. 1, the plain bearing composite can be oriented so that the sliding layer is located in the interior, i.e. on the interior surface of the bushing 1. It is likewise possible for the sliding layer to be located on the outside, as is explained in more detail in connection with FIGS. 6 to 14.

FIG. 2a shows a plain bearing bushing 1 having an axial collar 1b formed at one end face. This axial collar can be produced, for example, by crimping an end section of the initially cylindrical bushing 1. In the present case, the axial collar 1b (flange) is aligned at right angles. However, both larger and smaller angles are possible through to an inward-pointing flange (not shown).

FIG. 2b shows an alternative embodiment of a plain bearing bushing 1*. In the present case, it has a conical shape with the axial collar 1b* being located at the end face having the largest diameter.

FIG. 3 shows a first vibration-damping plain bearing assembly. It comprises a bearing housing 2 made of steel into which a cylindrical plain bearing bushing 1 having an axial collar 1b made by rolling from the plain bearing composite is inserted. A simple cylindrical pin 3 having an end section 3a having an enlarged diameter which rests on the axial collar 1b of the plain bearing bushing 1 is provided as the bearing shaft, so that it is secured axially in at least one direction by the plain bearing bushing 1. At the same time, the plain bearing bushing 1 is likewise secured against slipping out from the bearing housing 2 by the axial collar 1b. The plain bearing composite of which the plain bearing bushing 1 is made in the present case comprises a sliding layer, an elastomer layer, and a metallic dimensionally stable support layer arranged in between. If the sliding layer is on the inside and the elastomer layer is on the outside, i.e. in contact with the bearing housing, the pin 3 can slide in the plain bearing bushing 1. However, rotation of the bearing bushing 1 in the housing 2 is effectively prevented by the slip-inhibiting elastomer. Such a plain bearing assembly is typical for belt tensioners or two-mass flywheels.

FIG. 4 shows a further vibration-damping plain bearing assembly. It once again comprises a bearing housing 4 into which a plain bearing bushing 1 of the type shown in FIG. 2a has been inserted. To fix the plain bearing bushing 1 in the housing 4, a second collar 1c is formed. Owing to the firm bond between the individual layers of the plain bearing composite of which the plain bearing bushing 1 has been made, there is not a risk that the layer composite will be destroyed during forming of the second axial collar 1c.

In the plain bearing assembly of FIG. 4, a clinched bolt 6 having a widened clinched bolt head 6a now functions as bearing shaft and is in the present case inserted from below into the plain bearing bushing 1. The part 6b of the clinched bolt 6 which projects in an upward direction from the plain bearing bushing 1 in the present case has a slightly smaller diameter than the section (not visible) of the bolt which is in contact with the plain bearing bushing 1 and is joined with a fixed seat to the component 5 which can be turned relative to the bearing housing 4 by means of the plain bearing, for example by wobbling. The unit composed of component 5 and clinched bolt 6 created in this way can now move smoothly relative to the plain bearing bushing 1 inserted into the housing 4. Here, the sliding layer is once again located on the interior surface of the plain bearing bushing 1. Due to the elastic layer provided in the plain bearing composite of which the plain bearing bushing 1 is made, tolerances and also misalignments between the bearing components can be compensated without problems.

A further possible way of producing a plain bearing bushing from plain bearing composite according comprises deep drawing of the composite together with a stamping operation. Here, the cylindrical part of the plain bearing bushing 1 shown in FIG. 5 is formed by drawing of the composite which is initially present as flat material surrounding a punched hole in one or more steps. Finally, the region surrounding the drawn region is then stamped out, thus forming the axial collar of the bushing 1. As a result of this production technique, this plain bearing bushing 1** does not have a slit.

FIG. 6 shows the plain bearing bushing 1 of FIG. 2a in axial section. Here, as shown enlarged in the detail in FIG. 7, the sliding layer 10 is arranged on the inside. This preferably comprises polytetrafluoroethylene (PTFE) as sliding material. In principle, many sliding materials as are marketed, for example, by the applicant under the trade name Norglide® can be used here.

The sliding layer 10 is joined to an underlying dimensionally stable support layer 12 via an adhesive layer 11. This preferably consists of steel having a thickness of 0.2-0.5 mm. The dimensionally stable support layer 12 is in turn joined to an elastic layer 14 via a bonding layer 13. The elastic layer 14 preferably comprises an elastomer, in particular nitrile rubber. As a result of the elastic layer 14, excellent vibration damping is achieved in the plain bearing bushing 1 produced from the plain bearing composite. The elastic layer 14 which in the plain bearing assembly shown in FIGS. 3 and 4 is in contact over its entire area with the components to be provided with a bearing (housing 2, 4) in the case of the plain bearing assembly of FIG. 4 likewise effects effective structure-borne sound decoupling between the components 4 and 5. Furthermore, the slip-inhibiting elastic layer 14 prevents rotation of the plain bearing bushing 1 in the housing 4.

Figure 8:
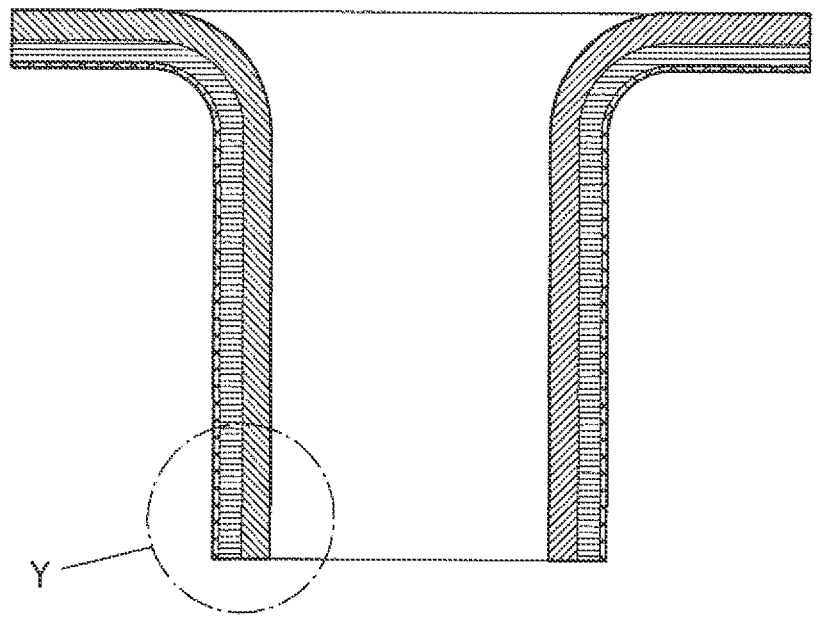
FIG. 8 shows a plain bearing bushing having an axial collar and an alternative layer structure to FIG. 6 formed from the plain bearing composite, in axial section.

An embodiment of the plain bearing bushing 1 having an axial collar 1b in which the sliding layer 10 is on the outside is shown in FIG. 8. This structure is shown in detail in FIG. 9; the designation and function of the individual layers 10-14 are analogous. In such an arrangement, the bearing housing 4 in the case of the plain bearing assembly of FIG. 4 again rotates smoothly relative to the other components 1, 5, 6.

Figures 9, 10:
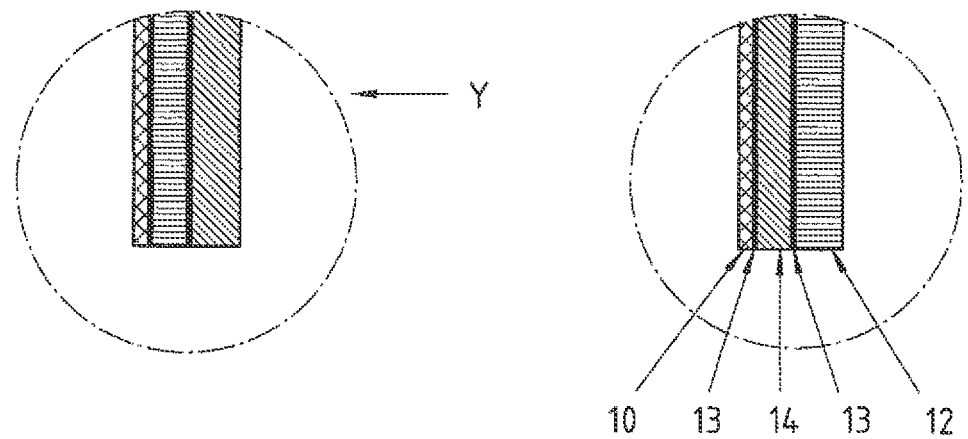
FIG. 9 shows the detail Y from FIG. 8.
FIG. 10 shows a layer structure different from FIG. 9.
Figure 11:
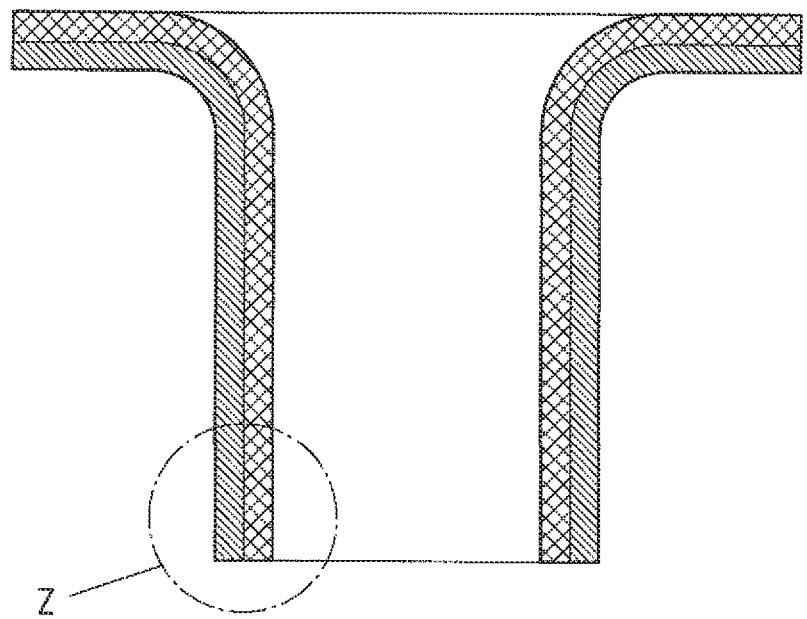
FIG. 11 shows a plain bearing bushing having an axial collar formed from the plain bearing composite, with the sliding layer and the dimensionally stable support layer of the plain bearing material being integrated.
Figure 12:
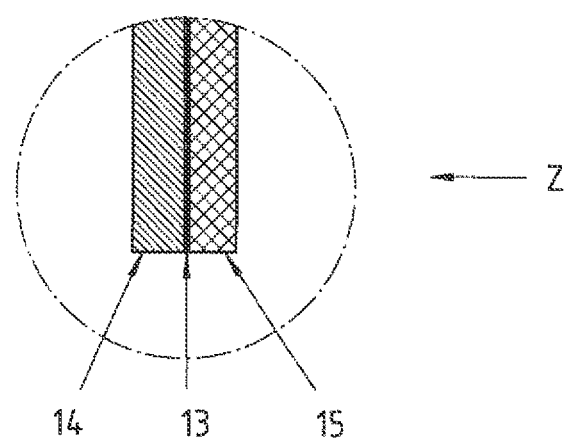
FIG. 12 shows the detail Z from FIG. 11.
Figure 13:
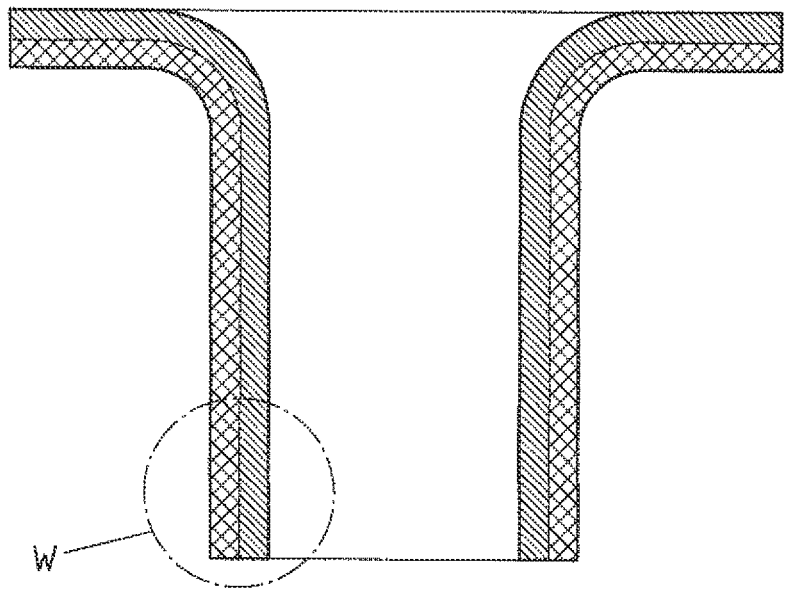
FIG. 13 shows the plain bearing bushing of FIG. 11 with an altered layer structure.
Figure 14:
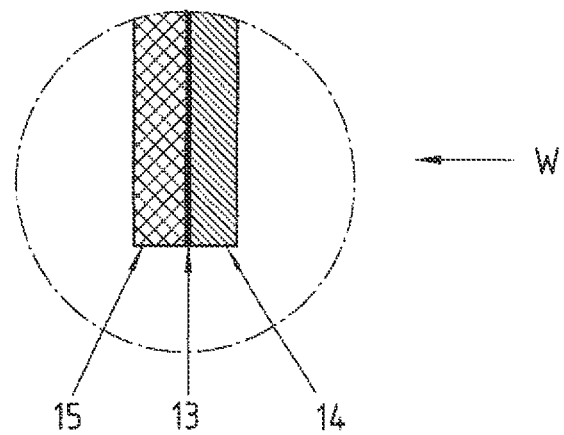
FIG. 14 shows the detail W from FIG. 13.

FIG. 10 shows an alternative layer structure of the plain bearing composite, in which the elastic layer 14 is present between the sliding layer 10 and the support layer 12. The elastic layer 14 is on its two sides firmly joined, in each case via a bonding layer 13, to the sliding layer 10 and to the dimensionally stable support layer 12. Such a composite can in principle be produced in one manufacturing step in which the sliding layer and the support layer, in each case present as continuous strip material, are each prepared by application of the bonding layer and then applied from the two sides to the elastic layer which is likewise supplied as continuous strip material. Here, the bond between sliding layer and elastic layer and between elastic layer and dimensionally stable support layer is produced under pressure and at a temperature of from 150 to 250° C. by means of a vulcanization process.

To obtain optimal damping properties, the thickness of the elastic layer 14 in the above-described plain bearings is preferably a multiple of the layer thickness of the sliding layer 10. In the present case, the sliding layer 10 has a thickness of about 0.1 mm and the elastic layer 14 has a thickness of about 0.4 mm.

FIGS. 11 to 14 (enlarged view in FIGS. 9, 10, 12 and 14) show further embodiments of a layer structure of the plain bearing composite. Here, the sliding layer 15 is used in a dimensionally stabilized embodiment. This preferably comprises polytetrafluoroethylene (PTFE) as sliding material. As reinforcing material, it is possible to use a woven metal mesh, an expanded metal, or another type of metal insert, in particular a perforated metal sheet or a metal nonwoven, with the reinforcing material being surrounded on all sides by sliding material. The dimensionally stabilized sliding layer 15 is joined via a bonding layer 13 to the elastic layer 14.

Once again it is possible to locate the dimensionally stabilized sliding layer on the inside or the outside of a plain bearing bushing produced from the composite material.

What is claimed is:

1. A vibration damping plain bearing composite comprising:
    an elastic layer, wherein the elastic layer includes an elastomer, the elastic layer having a thickness $t_{EL}$ between 0.15 mm and 5 mm;
    a sliding layer having a thickness $t_{SL}$; and
    a dimensionally stable support layer, wherein the elastic layer is arranged between the sliding layer and the dimensionally stable support layer and a ratio of $t_{EL}:t_{SL}$ is at least 3.

2. The vibration damping plain bearing composite as claimed in claim 1, further comprising a bonding layer between the elastic layer and the sliding layer.

3. The vibration damping plain bearing composite as claimed in claim 1, further comprising a bonding layer between the elastic layer and the dimensionally stable support layer.

4. The vibration damping plain bearing composite as claimed in claim 1, wherein the elastomer is selected from the group consisting of a nitrile rubber, a neoprene rubber, a silicone rubber, an olefinic elastomer, a styrene elastomer, a thermoplastic elastomer, a crosslinked elastomer, a polyether-polyester elastomer, an ethylene-propylene elastomer, ethylene-acrylate rubbers, a fluoro elastomer, and any combination thereof.

5. The vibration damping plain bearing composite as claimed in claim 1, wherein the sliding material present in the sliding layer comprises a plastic.

6. The vibration damping plain bearing composite as claimed in claim 5, wherein the plastic is selected from the group consisting of a fluoropolymer, polyacetal, polyether ether ketone (PEEK), polyethylene (PE), polysulfone, polyamide (PA), polyphenylene sulfide (PPS), polyurethane (PUR), polyester, polyphenylene oxide, and mixtures thereof.

7. The vibration damping plain bearing composite as claimed in claim 1, wherein the dimensionally stable support layer comprises metal.

8. The vibration damping plain bearing composite as claimed in claim 1, wherein the thickness $t_{SL}$ of the sliding layer is from 0.05 mm to 1.0 mm.

9. The vibration damping plain bearing composite as claimed in claim 1, wherein the dimensionally stable support layer has a thickness of 0.1 mm to 5 mm.

10. The vibration damping plain bearing composite as claimed in claim 1, wherein the thickness of elastic layer is from 0.3 mm to 0.6 mm.

11. The vibration damping plain bearing composite as claimed in claim 1, wherein the ratio $t_{EL}:t_{SL}$ is at least 5.

12. The vibration damping plain bearing composite as claimed in claim 11, wherein the ratio $t_{EL}:t_{SL}$ is at least 50.

13. A vibration damping plain bearing composite comprising:
- an elastic layer, wherein the elastic layer includes an elastomer and has a thickness $t_{EL}$ between 0.15 mm and 5 mm;
- a sliding layer having a thickness $t_{SL}$;
- a dimensionally stable support layer, wherein the dimensionally stable support layer includes steel;
- a first bonding layer between the elastic layer and the sliding layer; and
- a second bonding layer between the dimensionally stable support layer and the elastic layer, wherein at least one of the first and second bonding layer comprises silane, and wherein the elastic layer is arranged between the sliding layer and the dimensionally stable support layer and a ratio of $t_{EL}:t_{SL}$ is at least 3.

\* \* \* \* \*